(12) United States Patent
Anderson, Jr. et al.

(10) Patent No.: US 8,854,202 B2
(45) Date of Patent: Oct. 7, 2014

(54) UNIFIED DISPLAY OF ALARM CONFIGURATIONS BASED ON EVENT ENROLLMENT OBJECTS

(75) Inventors: Thomas Anderson, Jr., Lakemoor, IL (US); Dario Incorvaia, Monza (IT)

(73) Assignee: Siemens Aktiengesellschaft, Munich (DE)

( * ) Notice: Subject to any disclaimer, the term of this patent is extended or adjusted under 35 U.S.C. 154(b) by 162 days.

(21) Appl. No.: 13/538,073

(22) Filed: Jun. 29, 2012

(65) Prior Publication Data

US 2013/0082832 A1 Apr. 4, 2013

Related U.S. Application Data

(63) Continuation-in-part of application No. PCT/US2011/054141, filed on Sep. 30, 2011.

(60) Provisional application No. 61/541,925, filed on Sep. 30, 2011.

(51) Int. Cl.
```
G08B 23/00      (2006.01)
G05B 23/02      (2006.01)
G06F 3/048      (2013.01)
G05B 15/02      (2006.01)
```
(52) U.S. Cl.
CPC ........ *G06F 3/048* (2013.01); *G05B 2219/2642* (2013.01); *G05B 23/0272* (2013.01); *G05B 15/02* (2013.01)
USPC ......................................... 340/501

(58) Field of Classification Search
USPC ............. 340/501, 506, 517, 539.1, 541, 10.4, 340/286.01, 286.05; 715/853; 719/318
See application file for complete search history.

(56) References Cited

U.S. PATENT DOCUMENTS

| | | | |
|---|---|---|---|
| 8,626,210 B2 * | 1/2014 | Hicks, III | 455/466 |
| 2003/0025599 A1 * | 2/2003 | Monroe | 340/531 |
| 2003/0078677 A1 * | 4/2003 | Hull et al. | 700/1 |
| 2005/0275525 A1 * | 12/2005 | Ahmed | 340/524 |
| 2006/0010388 A1 * | 1/2006 | Imhof et al. | 715/734 |
| 2010/0281387 A1 * | 11/2010 | Holland et al. | 715/735 |
| 2011/0088000 A1 * | 4/2011 | Mackay | 715/853 |

* cited by examiner

*Primary Examiner* — Phung Nguyen

(57) ABSTRACT

Management systems, methods, and mediums. A method includes identifying a description of a system object from a request to generate an event enrollment object to monitor the system object in response to receiving the request. The method includes storing the description of the system object in association with the event enrollment object. The method includes identifying the stored description of the system object associated with the event enrollment object in response to identifying an alarm generated for the event enrollment object. Additionally, the method includes including the description of the system object in a notification of the alarm generated for event enrollment object.

20 Claims, 5 Drawing Sheets

US 8,854,202 B2

UNIFIED DISPLAY OF ALARM CONFIGURATIONS BASED ON EVENT ENROLLMENT OBJECTS

This application claims priority to PCT Application Serial No. PCT/US2011/054141, filed Sep. 30, 2011, entitled "Management System with Versatile Display" and to U.S. Provisional Patent Application Ser. No. 61/541,925, filed Sep. 30, 2011, entitled "Management System Using Function Abstraction for Output Generation", both of which are hereby incorporated by reference. This application also shares some subject matter in common with, but is otherwise unrelated to, the following patent applications, filed concurrently herewith, all of which are incorporated by reference:

U.S. patent application Ser. No. 13/537,975 for "Graphical Symbol Animation with Evaluations for Building Automation Graphics";

U.S. patent application Ser. No. 13/538,275 for "Navigation and Filtering with Layers and Depths for Building Automation Graphics";

U.S. patent application Ser. No. 13/537,911 for "Automated Discovery and Generation of Hierarchies for Building Automation and Control Network Objects";

U.S. patent application Ser. No. 13/538,182 for "Management System User Interface in a Building Automation System"; and U.S. patent application Ser. No. 13/538,242 for "Management System User Interface for Comparative Trend View"

TECHNICAL FIELD

The present disclosure is directed, in general, to management systems and, more particularly, to a unified display of alarm configurations in a building management system based on event enrollment of objects associated with devices monitored and/or controlled within a building.

BACKGROUND OF THE DISCLOSURE

Building management or automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors and alarm actuators dispersed throughout an entire building or campus. Fire safety systems also include widely dispersed devices in the form of smoke alarms, pull stations and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. The devices within building automation systems may communicate using a building automation and controls network (BACnet) communications protocol. The BACnet protocol allows for communication in building automation and control systems for HVAC, lighting, security and safety system applications.

Historically, management systems used to display and access data for monitoring and controlling operations of the building automation system have been relatively rigid in their user interface architecture. For example, certain objects or points that may need to be monitored may not be able to generate an alarm for themselves. In BACnet, an event enrollment object may be able to watch a property of such an object and generate an alarm when that property's value is outside a defined range or state. However, the alarm is generated on a conventional event enrollment object following the BACnet protocol instead of the actual object. As a result, since a vast number of objects of the same type (e.g., an object for a temperature sensor output) are often commissioned for monitoring by a building automation system within a building, it is typically not clear to a user what object is really in alarm. Notifying the user that an event enrollment object is in alarm may not provide enough information for a user to know what is really in alarm.

There is a need, therefore, for including additional information in a display of alarm configurations based on event enrollment objects.

SUMMARY OF THE DISCLOSURE

Various disclosed embodiments relate to systems and methods for providing additional information in a display of alarm configurations based on event enrollment objects.

Various embodiments include management systems, methods, and mediums. A method includes identifying a description of a system object from a request to generate an event enrollment object to monitor the system object in response to receiving the request. The method includes storing the description of the system object in association with the event enrollment object. The method includes identifying the stored description of the system object associated with the event enrollment object in response to identifying an alarm generated for the event enrollment object. Additionally, the method includes including the description of the system object in a notification of the alarm generated for event enrollment object.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide a description of system objects that are monitored by event enrollment objects configured to monitor the system objects for an alarm condition and to generate a notification of the alarm. Embodiments of the present disclosure provide users with the ability to include descriptions for the system object when requesting generation of a corresponding event enrollment object. Such description information includes a unique name of the system object. Embodiments of the present disclosure manage the description information, such that, when an alarm is generated for the generated event enrollment object, the user is provided notification of the alarm and information describing the system object being monitored by the event enrollment object in order to discriminate the respective alarm notification as being associated with the system object corresponding to the description information.

Figure 1:
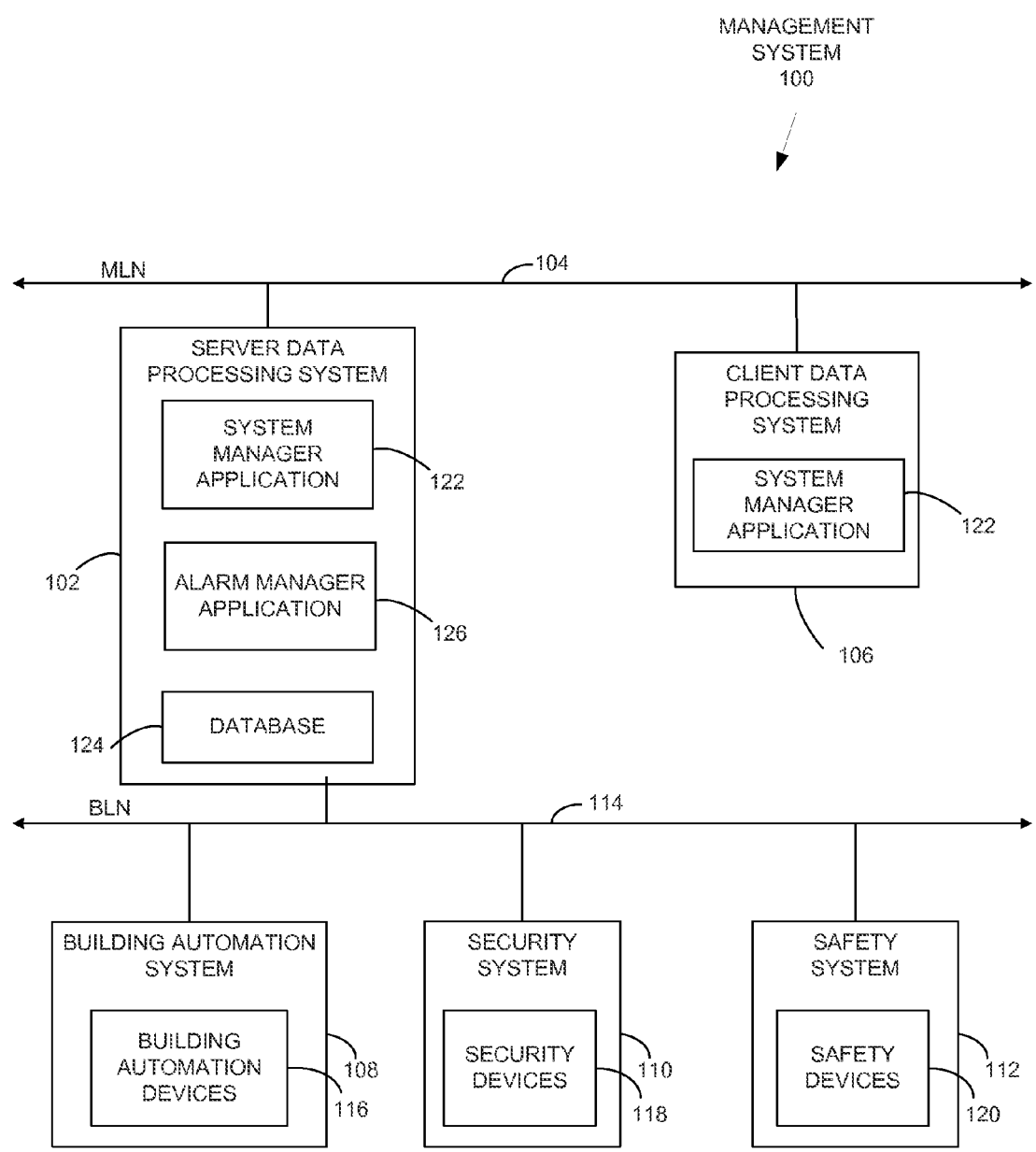
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected via a management level network (MLN) 104 to a client data processing system 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security system devices 118 and safety system devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor or other space of a building. For example, devices in the devices 116-120 may send and receive information to and from other devices in the devices 116-120 using one or more FLNs present in management system 100.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106, and/or other devices connected via MLN 104. The system manager application 122 is a collection of software and associated data files that provides a user-modifiable and intuitive graphical user interface for allowing a user to monitor, review and control various points and devices in the management system 100. The system manager application 122 may include, for example, without limitation, executable files, user-layout-definition files, graphics control modules, an infrastructure interface, and/or a number of software extensions. In some embodiments, system manager application 122 may be an application framework as described in PCT Application Serial No. PCT/US2011/054141, entitled "Management System with Versatile Display" and U.S. Provisional Patent Application Ser. No. 61/541,925, entitled "Management System Using Function Abstraction for Output Generation".

The server data processing system 102 includes a database that stores information about the devices 116-120 within the management system 100. A database 124 includes one or more data models of data points, devices, and other objects in the management system 100. For example, the database 124 may store values for one or more inputs and outputs of devices in the BAS 108 (e.g., temperature, alarm status, humidity). These values may be referred to as a point or data point. As referenced herein, a "point" or "data point" may be (i) any physical input or output to or from a respective controller, field device, sensor or actuator, or (ii) any virtual point associated with a control application or logic object within a field controller or field panel of the systems 108-112 that is measured, monitored or controlled. The database 124 may also store static information, such as model numbers, device types, and/or building and room-installation location information about devices in the management system 100. The database 124 may also store graphical models of one or more buildings managed by the management system 100. For example, the graphical models may include layouts and schematics of one or more rooms, floors and buildings managed by the management system 100.

In these illustrative embodiments, objects in the management system 100 include anything that creates, processes or stores information regarding data points or otherwise serves as a software proxy for a data point, such as analog, binary, or multistate inputs and outputs of physical devices (e.g., BAS controllers, field panels, sensors, actuators, cameras, etc.). Objects may also include data files, such as control schedules, trend reports, calendars, and the like.

In various embodiments, the database 124 includes hierarchy definitions that identify relationships between objects in the system. For example, a hierarchy may include a folder for a "floor" in a building with multiple child folders in the form of "rooms". Each "room" object, in turn, may have several child objects, such as "ventilation damper", "smoke detector", and "temperature sensor". Such hierarchy definitions among objects may employ conventional BACnet structures and may take many other forms. It will be appreciated that the use of hierarchical files in the management system 100 allows for technicians to define nearly any desirable hierarchy, the result of which is stored as one of the defined hierarchical files, as discussed further below. The database 124 stores files identifying different versions of hierarchies between the objects of the system, including those representative of the devices 116-120.

The server data processing system 102 includes an alarm manager application 126 to monitor objects in the management system 100 and return information about the alarms generated. The alarm manager application 126 is a software application that runs on the server data processing system 102. The alarm manager application 126 includes functionality for identifying alarms generated within the managements system 100 and including information with the generated alarms.

The system manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing system 106) propagates alarm status information, among other things, to various other data objects in the system. An example of a suitable alarm propagation system is provided in U.S. patent application Ser. No. 12/566,891, filed Sep. 25, 2009, which is assigned to the assignee of the present invention and is incorporated by reference herein.

In various embodiments, system manager application 122 may, via server data processing system 102 or client data processing system 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122, via server data processing system 102 or client data processing system 106, provides a user with the functionality to monitor real-time information about the status of one or more devices and objects in the management system 100. The system manager application 122, via server data processing system 102 or client data processing system 106, also provides a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

Additional descriptions and examples of the management system 100 and components that may be present within the management system 100 may be found in Patent Cooperation Treaty Application Serial No. PCT/US2011/054141, filed Sep. 30, 2011, entitled "MANAGEMENT SYSTEM WITH VERSATILE DISPLAY" and U.S. Provisional Patent Application Ser. No. 61/541,925, filed Sep. 30, 2011, entitled "MANAGEMENT SYSTEM USING FUNCTION ABSTRACTION FOR OUTPUT GENERATION". Both of these applications are hereby incorporated by reference as if fully set forth herein.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, embodiments of the management system 100 may not include one or more of the BAS 108, the security system 110, and/or the safety system 112.

Figure 2:
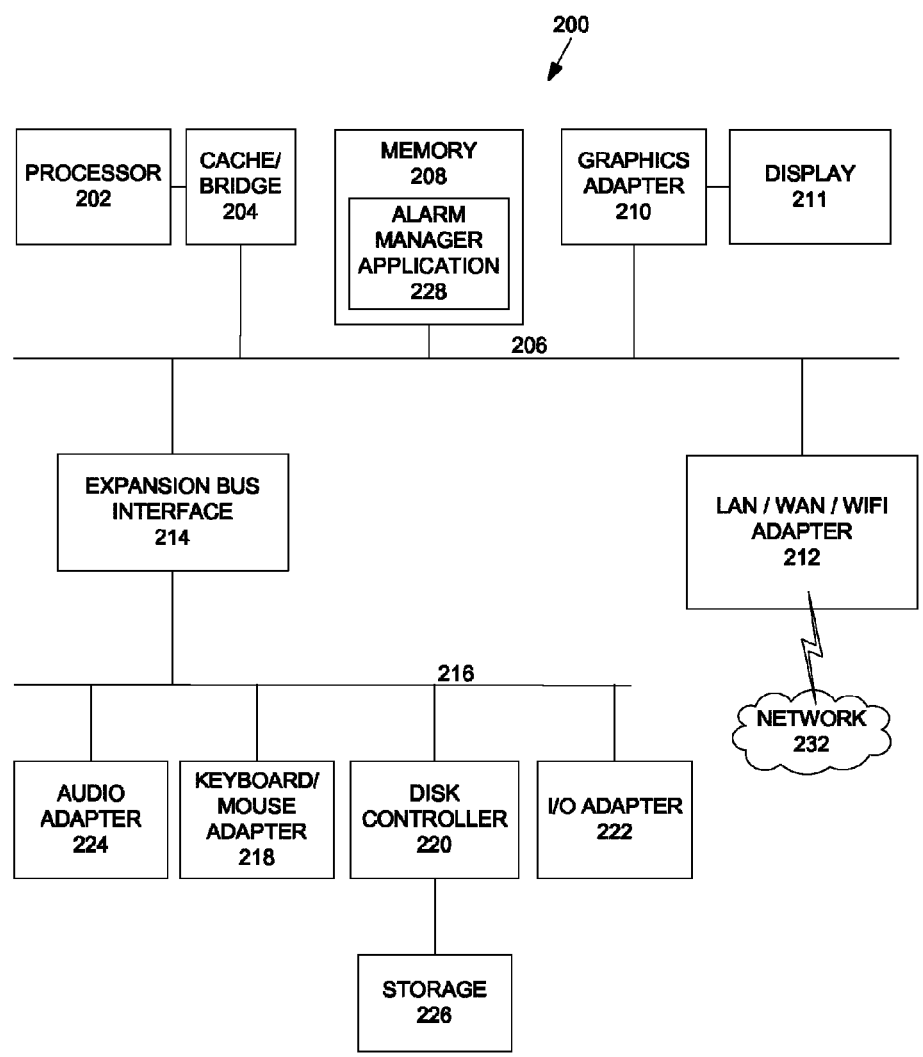
FIG. 2 illustrates a block diagram of a data processing system that may be employed in the management system for implementing in which various embodiments of the present disclosure are implemented.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing system 106.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement unified display of alarm configurations based on event enrollment of objects associated with devices monitored and/or controlled within a building.

LAN/WAN/Wifi adapter 212 may be connected to a network 232, such as, for example, MLN 104 in FIG. 1. As further explained below, the network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system.

In various embodiments of the present disclosure, the data processing system 200 executes program code of the alarm manager application 228 in the memory 208. The alarm manager application 228 is an example of one embodiment of alarm manager application 126 in FIG. 1. For example, the processor 202 executes program code of the alarm manager application 228 to store information about system objects and present the information about the system objects when an alarm is generated.

Figure 3:
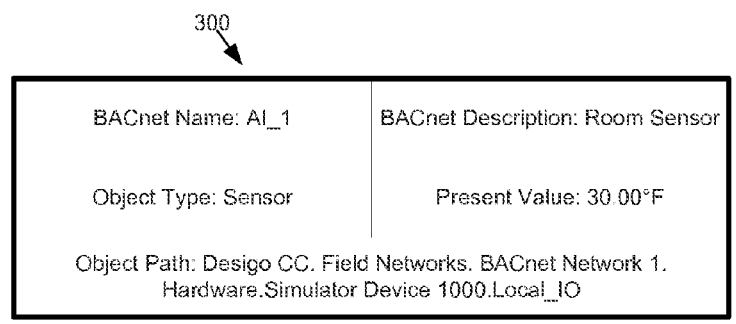
FIG. 3 illustrates a block diagram of a system object 300 in accordance with disclosed embodiments.

In various embodiments, the system objects are objects that are not able to generate an alarm for themselves. For example, the system object 300 may be an object for a property of a device in a building managed in management system 100. In some embodiments, the system object is a BACnet object or an object that is generated and communicated with using BACnet communication protocols. FIG. 3 illustrates a block diagram of a system object 300 in accordance with disclosed embodiments. In this illustrative example, the system object 300 includes multiple elements, for example, without limitation, a BACnet object name 302 (e.g., "AI_1"), a BACnet description 304 (e.g., "Room Sensor"), an object type 306 (e.g., "Sensor"), a present value 308 (e.g., "30.00° F."), and an object path 310 (e.g., "Desigo CC.Field Networks.BACnet. Network1.Hardware.Simulator Device 1000.Local_IO"). For example, the system object 300 is an object for an analog input of temperature into a room sensor (e.g., a room sensor in building automation devices 116). In other embodiments, other elements may be included in the system object 300 in addition to or in place of the elements listed in the system object 300.

In various embodiments, a user or operator may wish to be notified when the property of the device meets a certain condition. For example, a user may wish to be notified when a value for an input or output of the device reaches a certain level or is outside of a certain range. Because the system object is unable to generate an alarm, an event enrollment object may be generated to monitor and return a notification when the property of the system object meets some pre-specified alarm condition. In BACnet, an event enrollment object is an object that describes an event that might be an error condition. However, oftentimes, the event enrollment objects that follow the BACnet protocol without implementing the present invention are simply auto generated copies of conventional BACnet event enrollment objects configured to monitor other objects without discriminating as to the identity of a specific object under alarm. In particular, when a conventional BACnet event enrollment object is copied without implementing the present invention, the conventional BACnet event enrollment object may have a unique identifier for the given event (such as "event1") that is returned with an alarm notification. Such a unique identifier may be of little information to a user that is used to viewing and working with the underlying system object or corresponding point or field device 116, 118 or 120 (such as a temperature sensor).

Figure 4:
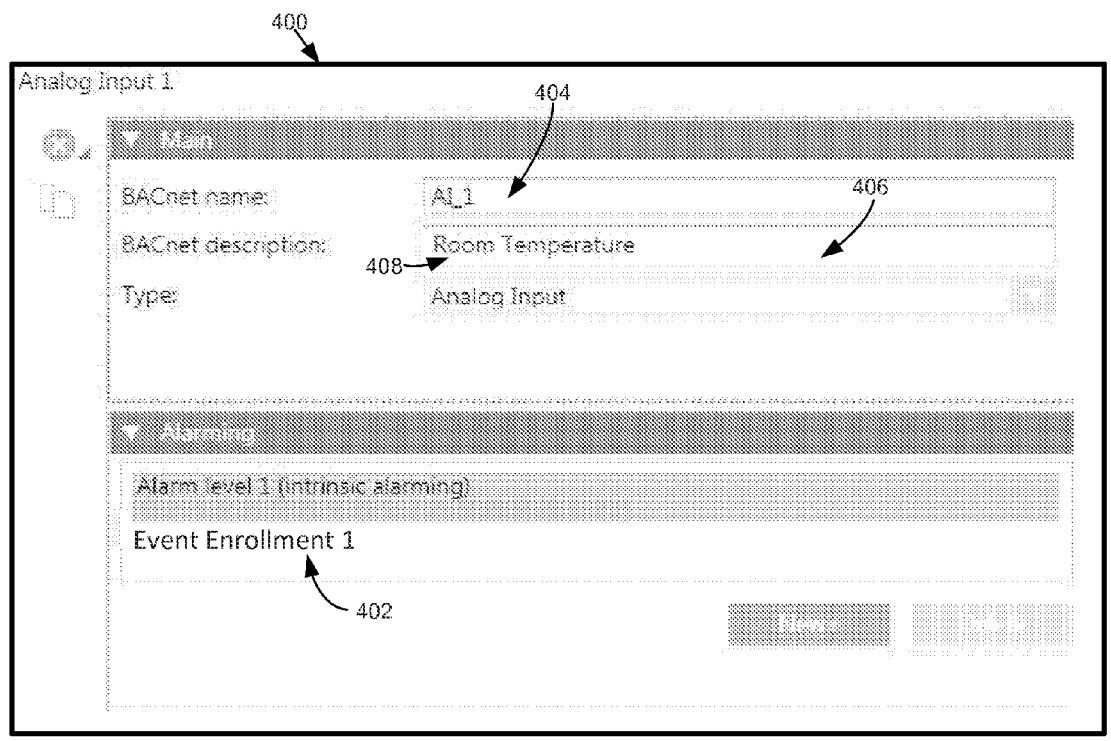
FIG. 4 illustrates an exemplary screen capture of a graphical user interface generated by the data processing system of FIG. 2 for requesting generation of an event enrollment object with an object description in accordance with disclosed embodiments.

Accordingly, various embodiments of the present disclosure provide a user interface for a user to include information describing the system object (also referenced as "description information", "object description" and "description of system object" herein) when submitting a request to have an event enrollment object monitor the system object. FIG. 4 illustrates an exemplary screen capture of a graphical user interface 400 generated by the data processing system 102, 106 or 200 for requesting generation of an event enrollment object with an object description in accordance with disclosed embodiments. For example, the graphical user interface 400 may be generated by the system manager application 122 running on the client data processing system 106 in FIG. 1.

In this illustrative example, the graphical user interface 400 is an example of an interface for allowing a user to input a request to have an event enrollment object 402 (i.e., named "Event Enrollment 1") monitor system object 404 (i.e., named "AI_1"). The graphical user interface 400 additionally includes a field 406 to receive a user input for a description 408 of the system object 404. In this example, the description 408 input is for "Room Temperature". For example, the system object 404 may be an analog input to a digital thermostat or field controller in the BAS system 108 from an output temperature sensor (e.g., a field device 116) for temperature in a room in a building managed in management system 100. In another example, the user may enter any type of description information that may be useful for later identifying the system object. For example, the description 408 of the system object 404 may include a location (e.g., building, floor and/or room) of the device represented by the system object 404 or any other unique information describing the system object 404. When the request is submitted, the server data processing system 102 generates the event enrollment object 402 to monitor and watch the values for temperature for the data point of the system object 404.

The alarm manager application 228 running on the data processing system 200 receives the request to generate the event enrollment object 402. In response to receiving the request, the data processing system 200 identifies the description 408 of the system object 404 in the request and the event enrollment object 402. The data processing system 200 stores the description 408 of the system object 404 with or in relation to an identifier of the event enrollment object 402 configured to monitor the system object 404. For example, the data processing system 200 may store the description 408 and the identifier in the database 124. In various embodiments, the data processing system 200 may store and maintain lists of event enrollment objects that have been generated in the management system 100 and associate each event enrollment object with a description of the system object being monitored in the management system 100.

When the property of the system object 404 meets the condition specified in the event enrollment object 402, a notification of an alarm is generated in the management system 100. For example, the server data processing system 102 may generate the notification of the alarm for the event enrollment object 402. Upon receipt of the notification of the alarm, the alarm manager application 228 running on the data processing system 200 identifies the event enrollment object 402 that the alarm notification was generated for and includes the description 408 of the system object 404 in the notification of the alarm.

For example, the data processing system 200 may intercept a packet that includes information for the alarm generated for the event enrollment object 402 prior to the packet being received by a client device (e.g., client data processing system 106). The data processing system 200 may then identify which system object the event enrollment object 402 was monitoring in the management system 100. For example, the data processing system 200 retrieves the stored lists of enrolled event objects and associates the event enrollment object 402 with the description 408 of the system object 404 from the stored list. The data processing system 200 then includes the additional description information in the alarm packet (e.g., the description 408 of the system object 404) for display of the notification of the alarm with the description information describing the monitored system object 404 to a user at a client device (e.g., client data processing system 106).

Figure 5:
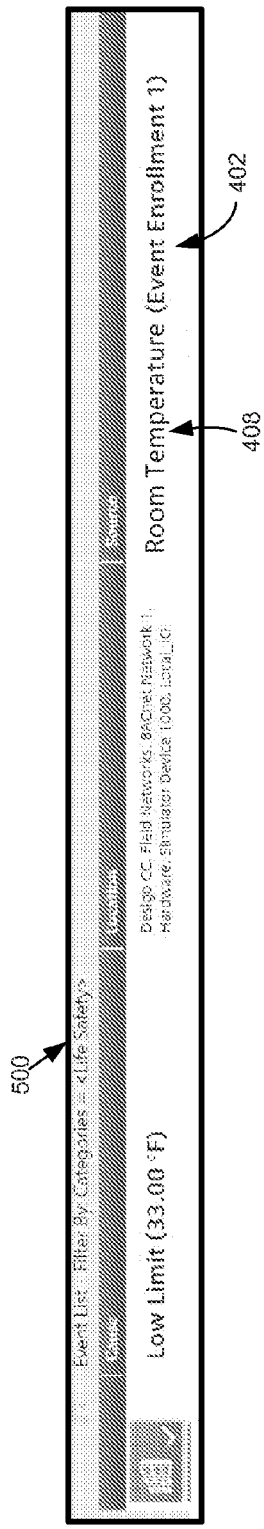
FIG. 5 illustrates an exemplary screen capture of a notification of an alarm generated for an event enrollment object including the object description in accordance with disclosed embodiments.

FIG. 5 illustrates an exemplary screen capture of a notification 500 of an alarm generated for an event enrollment object including the object description in accordance with disclosed embodiments. For example, the notification 500 may be received and displayed by the system manager application 122 running on the client data processing system 106 in FIG. 1.

In this illustrative example, the notification 500 is an example of a notification of an alarm generated for the event enrollment object 402 where the notification 500 includes information describing the system object 404 that the event enrollment object 402 was monitoring. For example, the event enrollment object 402 may have been generated to monitor the system object 404 for a data point of an input of a value for temperature in a room as output from a temperature sensor (e.g., field device 116) located within the room. In this example, the event enrollment object 402 includes (e.g., is configured to receive and act on) a condition to return an alarm if the temperature in the room drops below 33.00° F. Upon detection of the condition being met, the server data processing system 102 may generate an alarm packet for the event enrollment object 402. The alarm manager application 228 running on the data processing system 200 intercepts the alarm packet to include the description 408 of the system object 404 for room temperature. In this manner, the data processing system 200 and the alarm manager application 228 provide the user with additional information describing the actual object that the user desired to have monitored.

Figure 6:
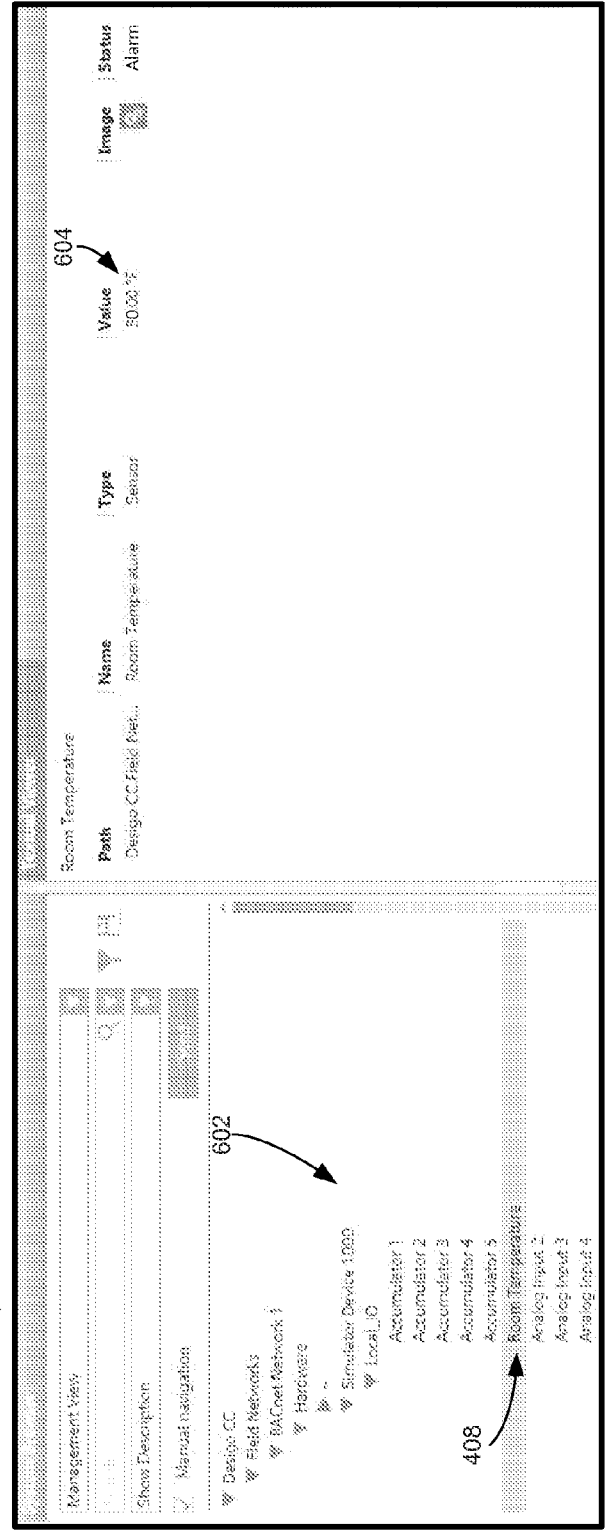
FIG. 6 illustrates an exemplary screen capture of a graphical user interface generated by the data processing system of FIG. 2 to display information about a system object that an alarm was generated for in accordance with disclosed embodiments.

In various embodiments, the data processing system 200 includes a link to the system object (e.g., system object 300) in the notification 500. For example, if the user selects the description 408 of the system object 404, the client data processing system 106 may then display, via the link in the notification 400, the additional description information describing the system object 404. FIG. 6 illustrates an exemplary screen capture of a graphical user interface 600 displaying information about a system object that an alarm was generated for in accordance with disclosed embodiments. For example, the graphical user interface 600 may be generated by the system manager application 122 running on the client data processing system 106 in FIG. 1. In this illustrative example, the graphical user interface 600 includes a display of an identifier of the system object 404 (corresponding to the respective temperature sensor field device) in a hierarchy 602 of system object identifiers and a display of a current value 604 for the selected system object (e.g., room temperature).

The illustration of the data processing system 200 in FIG. 2 is intended as an illustrative example of various embodiments of the present disclosure and not meant to imply physical or architectural limitations to the manner in which different illustrative embodiments may be implemented. For example, one data processing system may perform the generation of event enrollment objects and alarms. A different data processing system may store and maintain descriptions of the system objects for which the event enrollment objects are generated and intercept and include the additional information in the notifications of the alarms. A third data processing system may then present a display of the notification of the alarm and the information describing the system object to a user.

Figure 7:
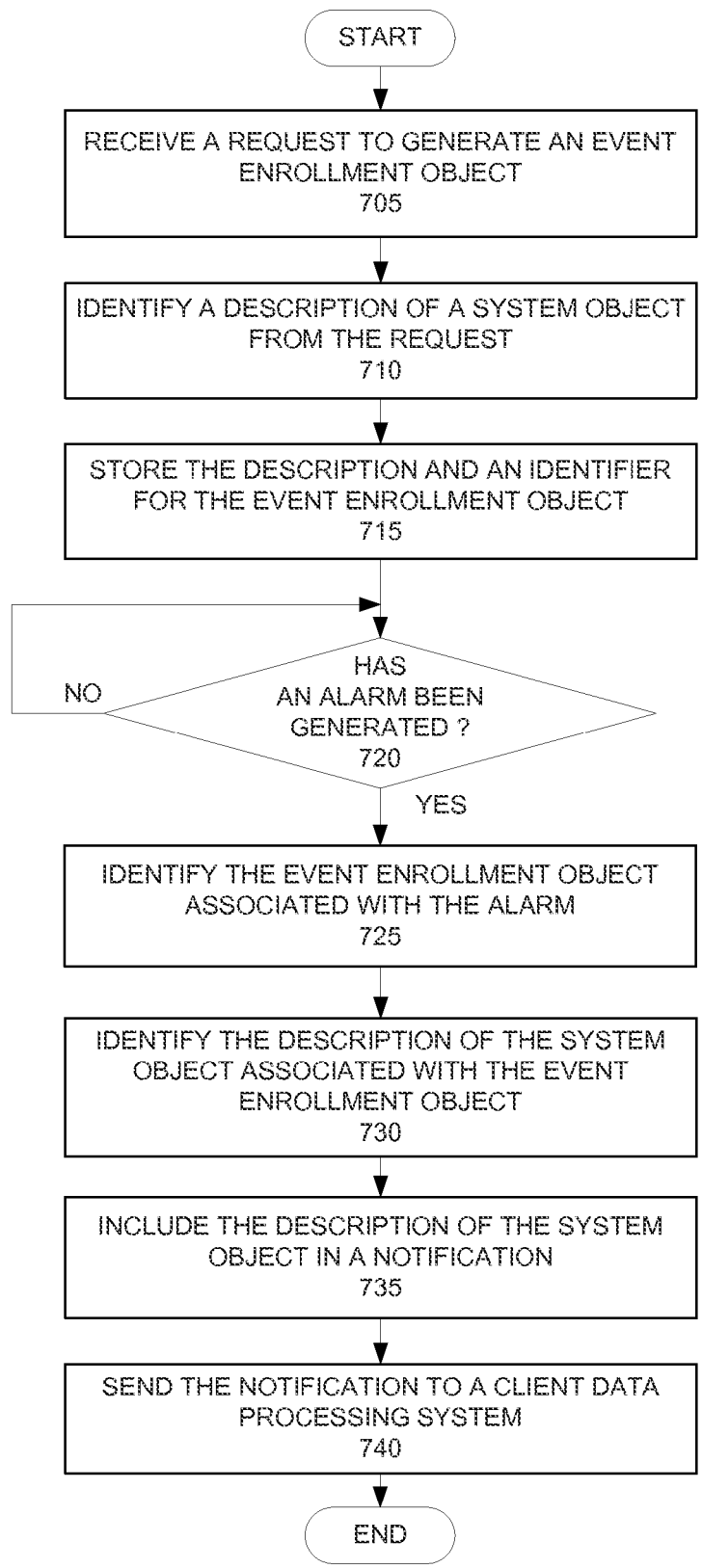
FIG. 7 illustrates a flowchart of a process for managing description information about system objects in accordance with disclosed embodiments.

FIG. 7 depicts a flowchart of a process for managing description information about system objects in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the alarm manager application 228 may comprise the executable instructions to cause one or more data processing systems to perform such a process.

The process begins with the system receiving a request to generate an event enrollment object (step 705). In step 705, the system may receive the request from a client data processing system to have an event enrollment object monitor a system object that may not be able to generate an alarm. The request may be a request to generate an alarm in response to a value for a data point of the system object meeting the condition. For example, the system object may be associated with a data point for a field device 116, 118, or 1120 in a building.

The system identifies a description of a system object from the request (step 710). In step 710, the system identifies the description from a user input comprising the description of the system object. The system stores the description and an identifier for the event enrollment object (step 715). In step 715, the system stores the description of the system object in association with the identifier of the event enrollment object. For example, the system may link the description to the identifier. The system may store a description and identifier each time an event enrollment object is requested to be generated. As a result, the system may maintain a table comprising a list of event enrollment objects linked to corresponding system object descriptions. In various embodiments, the system may generate and provide a user interface as a request for a user to input the description of the system object. For example, the system may generate and provide the graphical user interface 400 with the field 406 for the user to input the description "Room Temperature" for the description of the system object.

The system determines whether an alarm has been generated (step 720). In step 720, the system may receive an alarm packet generated when the value for the data point associated with the system object meets the condition specified in the event enrollment object. For example, the system may receive the alarm packet (e.g., via the BLN 114 network) from a field panel or field controller in the BAS system 108, the security system 110 or the safety system 112 communicably coupled to the device 116, 118 or 120 associated with the system object. The system may intercept or otherwise receive the alarm packet generated for the event enrollment object prior to receipt of the alarm packet at the client data processing system.

If the system determines that the alarm has not been generated, the system returns to step 720 to continue to monitor for generation of an alarm. If the system determines that the alarm has been generated, the system identifies the event enrollment object associated with the alarm (step 725). In step 725, the system identifies the event enrollment object for which the alarm was generated. For example, the system may identify the event enrollment object from an identifier of the event enrollment object in the alarm packet.

The system identifies the description of the system object associated with the event enrollment object (step 730). In step 730, the system may identify the description of the system object from a database storing the description in association with the identifier of the event enrollment object and the description of the system object.

The system includes the description of the system object in a notification (step 735). In step 735, the system the system may include the description of the system object in an alarm packet generated for the event enrollment object. The system sends the notification to a client data processing system (step 740), with the process terminating thereafter. In step 740, the system may include a description of a system object each time an alarm is generated for an event enrollment object if the description of the system object was previously stored and/or registered with the system. The system may send the notification to the client data processing system for display of the notification to include both the notification of the alarm and the description of the system object. The system may also include a link to the system object in the notification.

Disclosed embodiments provide a description of system objects being monitored by event enrollment objects in notifications of an alarm generated for the event enrollment objects. Disclosed embodiments provide users with the ability to include descriptions for the system object in when requesting generation of the event enrollment objects. Disclosed embodiments store and manage the description information for the event enrollment objects. When an alarm is generated for the event enrollment object, disclosed embodiments provide the user with a notification of the alarm and information describing the system object being monitored by the event enrollment object.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method in a data processing system, the method comprising:
    identifying a description of a system object from a request to generate an event enrollment object to monitor the system object in response to receiving the request;
    storing the description of the system object in association with an identifier for the event enrollment object;
    receiving an alarm packet generated for the event enrollment object prior to receipt of the alarm packet at a client data processing system and in response to an alarm being generated for the event enrollment object;
    identifying the stored description of the system object associated with the event enrollment object; and
    including the description of the system object in the alarm packet for a notification of the alarm.

2. The method of claim 1 further comprising:
    sending the alarm packet to the client data processing system for display of the notification at the client data processing system.

3. The method of claim 2, wherein sending the alarm packet to the client data processing system for display of the notification at the client data processing system comprises:
    sending the alarm packet to the client data processing system for display of the notification including the description of the system object and a link to the system object.

4. The method of claim 1 further comprising:
    generating the event enrollment object to include a condition to generate the alarm in response to a value for data point of the system object meeting the condition, wherein the system object is associated with a data point for a device in a building; and
    generating the alarm for the event enrollment object in response to identifying that the value for data point associated with the device meets the condition from a management system communicably coupled to the device.

5. The method of claim 1 further comprising:
    providing a user with a user interface including a request to receive the description of the system object that the user is requesting to be monitored via the event enrollment object.

6. The method of claim 1 wherein storing the description of the system object in association with the event enrollment object comprises:
    storing the description of the system object in a table comprising a list of event enrollment objects linked to corresponding system object descriptions.

7. The method of claim 1 further comprising:
    receiving the request from a client data processing system, wherein the request includes the description of the system object as a user input describing the system object.

8. A data processing system comprising:
    a storage device comprising an alarm manager application;
    an accessible memory comprising instructions of the alarm manager application; and
    a processor configured to execute the instructions of the alarm manager application to:
        identify a description of a system object from a request to generate an event enrollment object to monitor the system object in response to receiving the request;
        store the description of the system object in association with an identifier for the event enrollment object;
        receive an alarm packet generated for the event enrollment object prior to receipt of the alarm packet at a client data processing system and in response to an alarm being generated for the event enrollment object;
        identify the stored description of the system object associated with the event enrollment object; and
        include the description of the system object in the alarm packet for a notification of the alarm.

9. The data processing system of claim 8, wherein the processor is further configured to execute the instructions of the alarm manager application to:
    send the alarm packet to the client data processing system for display of the notification at the client data processing system.

10. The data processing system of claim 9, wherein to send the alarm packet to the client data processing system for display of the notification at the client data processing system the processor is further configured to execute the instructions of the alarm manager application to:
    send the alarm packet to the client data processing system for display of the notification including the description of the system object and a link to the system object.

11. The data processing system of claim 8, wherein the processor is further configured to execute the instructions of the alarm manager application to:
    generate the event enrollment object to include a condition to generate the alarm in response to a value for data point of the system object meeting the condition, wherein the system object is associated with a data point for a device in a building; and
    generate the alarm for the event enrollment object in response to identifying that the value for data point associated with the device meets the condition from a management system communicably coupled to the device.

12. The data processing system of claim 8, wherein the processor is further configured to execute the instructions of the alarm manager application to:
    provide a user with a user interface including a request to receive the description of the system object that the user is requesting to be monitored via the event enrollment object.

13. The data processing system of claim 8, wherein to store the description of the system object in association with the event enrollment object the processor is further configured to execute the instructions of the alarm manager application to:
    store the description of the system object in a table comprising a list of event enrollment objects linked to corresponding system object descriptions.

14. The data processing system of claim 8, wherein the processor is further configured to execute the instructions of the alarm manager application to:

receive the request from a client data processing system, wherein the request includes the description of the system object as a user input describing the system object.

15. A non-transitory computer-readable medium encoded with executable instructions that, when executed, cause one or more data processing systems to:
    identify a description of a system object from a request to generate an event enrollment object to monitor the system object in response to receiving the request;
    store the description of the system object in association with an identifier for the event enrollment object;
    receive an alarm packet generated for the event enrollment object prior to receipt of the alarm packet at a client data processing system and in response to an alarm being generated for the event enrollment object;
    identify the stored description of the system object associated with the event enrollment object; and
    include the description of the system object in the alarm packet for a notification of the alarm.

16. The computer-readable medium of claim 15, wherein the computer-readable medium is further encoded with executable instructions that, when executed, cause one or more data processing systems to:
    send the alarm packet to the client data processing system for display of the notification at the client data processing system.

17. The computer-readable medium of claim 16, wherein the instructions that cause the one or more data processing systems to send the alarm packet to the client data processing system for display of the notification at the client data processing system comprise instructions that cause the one or more data processing systems to send the alarm packet to the client data processing system for display of the notification including the description of the system object and a link to the system.

18. The computer-readable medium of claim 15, wherein the computer-readable medium is further encoded with executable instructions that, when executed, cause one or more data processing systems to:
    generate the event enrollment object to include a condition to generate the alarm in response to a value for data point of the system object meeting the condition, wherein the system object is associated with a data point for a device in a building; and
    generate the alarm for the event enrollment object in response to identifying that the value for data point associated with the device meets the condition from a management system communicably coupled to the device.

19. The computer-readable medium of claim 15, wherein the computer-readable medium is further encoded with executable instructions that, when executed, cause one or more data processing systems to:
    provide a user with a user interface including a request to receive the description of the system object that the user is requesting to be monitored via the event enrollment object.

20. The computer-readable medium of claim 15, wherein the instructions that cause the one or more data processing systems to store the description of the system object in association with the event enrollment object comprise instructions that cause the one or more data processing systems to:
    store the description of the system object in a table comprising a list of event enrollment objects linked to corresponding system object descriptions.

\* \* \* \* \*